(No Model.)

F. A. WUNDERLICH.
HOSE COUPLING.

No. 603,460. Patented May 3, 1898.

WITNESSES:
Emile Ericson
G. E. Cordeaux.

INVENTOR.
Frederick A. Wunderlich
BY
E. F. Gennert
ATTORNEY.

THE NORRIS PETERS CO., PHOTO-LITHO., WASHINGTON, D. C.

UNITED STATES PATENT OFFICE.

FREDERICK A. WUNDERLICH, OF BROOKLYN, NEW YORK.

HOSE-COUPLING.

SPECIFICATION forming part of Letters Patent No. 603,460, dated May 3, 1898.

Application filed July 22, 1897. Serial No. 645,494. (No model.)

*To all whom it may concern:*

Be it known that I, FREDERICK A. WUNDERLICH, a citizen of the United States, and a resident of Brooklyn, in the county of Kings and State of New York, have invented certain new and useful Improvements in Hose-Couplings, of which the following is a specification.

My invention relates to hose-couplings, but more particularly to a new and useful swiveled nipple adapted to be connected to the pneumatic tires of carriages, such as bicycles and the like, and to describe and define my invention I make use of the accompanying drawings, in which—

Figure 1:
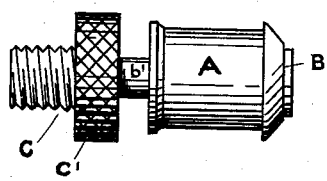
Figure 2:
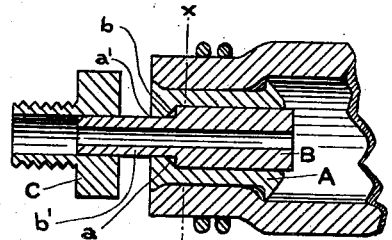
Figure 3:
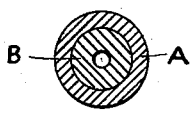

Figure 1 is a side view of my improved coupling. Fig. 2 is a sectional view through the center; Fig. 3, a cross-section at line *x x*, and Fig. 4 a sectional view of a modification.

In all of the figures the same part is indicated by the same letter.

The object of my invention is to produce, first, a nipple that will have a tight joint between its several parts without using springs, washers, or other packing, and, secondly, a coupling which can be readily attached to or removed from a tire without twisting or turning the hose.

Hose-couplings as commonly made have a flanged stem, adapted to enter the end of a hose, and a swivel which is placed on the flanged stem so as to rotate freely. To make a tight joint between the swivel and stem, a packing is required.

I avoid the necessity of using packing by forming a combined nipple and cylindrical bushing A, having an annular seat *a* on its interior and an opening *a'* of a smaller diameter for the purpose hereinafter explained. A sliding plunger, composed of a piston B, having an annular shoulder *b* and shank *b'*, neatly fits in the bushing A, as shown, the shank *b'* projecting through the opening *a'*. A male threaded nipple C, having, preferably, a knurled shoulder *c'*, is soldered or fastened on the shank *b'* a little distance from the free end of bushing A, so that the sliding and revolving plunger will move freely in said bushing. A hole is drilled through the plunger B and nipple C for the passage of air or liquid. The plunger and nipple when in position form the swivel-piece of the coupling.

Figure 4:
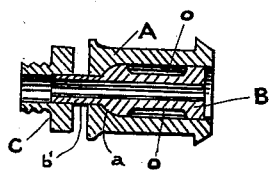

The seat may be rounded or beveled, and to lighten the plunger or piston and to reduce friction part of the same may be turned off, as at *o* in Fig. 4, without departing from the object of my invention. Either a male or a female thread may be used. A male nipple is shown.

In operation the bushing is secured into the hose or tubing H, the ring or rings on the periphery of the bushing assisting to keep it in place. In making a connection the nipple C is secured to a corresponding female thread by revolving the nipple and plunger-swivel, the bushing and hose remaining at rest. When pressure is put within the hose, the sliding plunger, having a larger area than the hole through it, is forced forward until the two seats are brought to bear against each other, when a tight joint will be made, the plunger fitting neatly in the bushing and acting as a guide to keep the two parts of the coupling central. This does away with the use of springs, packing, and other means to make a tight joint. The greater the pressure within the tube the tighter the two parts of the coupling will bear against each other at the seats.

Having described my invention, what I claim as new, and desire to secure by Letters Patent, is—

1. In hose-couplings the bushing as A, adapted to be secured within a rubber tube, having an annular seat in its interior as *a* in combination with a plunger as B provided with a shoulder as *b*, the shank *b'* passing through and extending beyond the bushing A, and the threaded connecting-nipple as C fastened to the free end of shank *b'* substantially as shown and described.

2. A hose-coupling consisting of the following three parts, namely: a hollow body-bushing adapted to be secured within a rubber tube, a plunger consisting of a piston and shank, the plunger being centrally positioned within the bushing so as to permit a free sliding and revolving movement, and a threaded nipple soldered or secured on the projecting end of the shank, substantially as shown and described.

3. In a hose-coupling the combination of a bushing as A adapted to be secured within a rubber tube, said bushing having one end portion of a smaller internal diameter than the other end, the difference in these two diameters forming an internal annular seat; of a hollow plunger as B provided with a shoulder and having a shank which passes through and extends beyond the smallest internal diameter end of bushing A and of a threaded nipple as C secured to the said shank, all combined in the manner set forth and described.

Signed at New York, in the county of New York and State of New York, this 9th day of June, A. D. 1897.

FREDERICK A. WUNDERLICH.

Witnesses:
E. WHITNEY,
E. F. GENNERT.